United States Patent Office 3,184,472
Patented May 18, 1965

3,184,472
1,1'-BIBENZOTRIAZOLES AND THEIR PREPARATION
Rudolph A. Carboni, Wilmington, Del., assignor to E. I. du Pont de Nemours and Company, Wilmington, Del., a corporation of Delaware
No Drawing. Filed Jan. 17, 1963, Ser. No. 252,058
11 Claims. (Cl. 260—308)

This invention relates to 1,1'-bibenzotriazoles, to a method for their preparation and to their conversion to dibenzo-1,3a,4,6a-tetraazapentalenes.

Polynuclear nitrogen-containing compounds are a useful class of organic materials, e.g., many have biological activity or are dyes or dye intermediates. However, many polynuclear compounds having several nitrogen atoms undergo degradation in the presence of electrophilic substitution reagents. Accordingly, the usefulness of such compounds is enhanced if they have sufficient structural stability to withstand treatment with such substitution reagents, e.g., nitric acid.

The new compounds of this invention are 1,1'-bibenzotriabole, an electrophilic reagent-stable dibenzenoid polynuclear organic nitrogen compound composed of two benzotriazole units coupled through their triazole rings, and its alkyl, halo, sulfo, nitro, amino and hydrocarbonoylamido derivatives. These compounds are represented by the structural formula

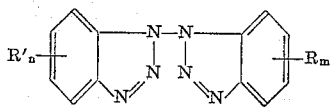

wherein R and R' each represent a monovalent substituent, e.g., alkyl of up to 18 carbons, halogen of atomic number 9–35, sulfo, nitro, amino or hydrocarbonoylamido

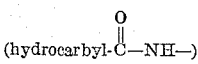

of up to 18 carbons, and $n$ and $m$ are cardinal numbers of zero to three, i.e., 0, 1, 2 or 3.

The process of preparing 1,1'-bibenzotriazole involves (a) complete diazotization, i.e., tetraazotization, of o,o'-diaminoazobenzene with nitrous acid and (b) chemical reduction of the bisdiazonium salt thus prepared.

The tetraazotization of o,o'-diaminoazobenzene, i.e., the conversion of both amine groups to diazonium salts, is carried out under conventional diazotization conditions (cf., Lucas and Pressman, "Principles and Practice in Organic Chemistry," John Wiley and Sons, New York, 1949, chapter 34). Typically, tetraazotization is effected by treatment of the diamino compound with at least two equivalents of sodium nitrite in an excess of aqueous mineral acid, e.g., hydrochloric, hydrobromic, sulfuric or nitric acid, generally at a temperature below about 20° C. and preferably 0–10° C. The sodium nitrite and aqueous mineral acid together serve as a source of nitrous acid, and it is to be understood that other sources of nitrous acid, which are conventionally employed in diazotization procedures, may be employed in the process of this invention. Generally the molar ratio of mineral acid to o,o'-diaminoazobenzene will be at least 4.5:1.

Reduction of the bisdiazonium salt is accomplished by treatment of the salt solution from step (a) with at least an equivalent amount of sulfur dioxide, copper-hydrobromic acid reagent or an azine derivative of an organic carbonyl compound at a temperature preferably in the aforesaid range. Precipitation of solid product containing 1,1'-bibenzotriazole begins soon after admixture of diazotate and reducing agent is started, and the reaction is complete within 30 minutes after admixture is complete. The 1,1'-bibenzotriazole can be isolated and purified by conventional procedures, e.g., by filtration of the aqueous reaction mixture and recrystallization of the separated solid from a suitable solvent such as ethanol, ethyl acetate, chloroform, acetic acid, dioxane, and the like.

1,1'-bibenzotriazole melts sharply with decomposition within the range 233–240° C. The products of its decomposite at the melting point and above are nitrogen and dibenzo-1,3a,4,6a-tetraazapentalene. The latter compound contains two benzenoid groups and has the structure

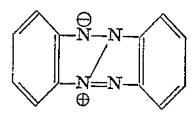

From this information, it is evident that the bibenzotriazole precursor, which has two nitrogen atoms more than its tetraazapentalene decomposition product, also has two benzenoid groups to each of which are attached two nitrogens in the ortho position, said benzenoid groups being linked together through a chain consisting of two of the nitrogen atoms. It is also evident that the two additional nitrogen atoms, i.e., those lost in thermal decomposition, are part of an all-nitrogen structure to which the two benzenoid groups are attached on opposite sides. Therefore, 1,1'-bibenzotriazole can be classified as a dibenzohexaaza compound which has the structure

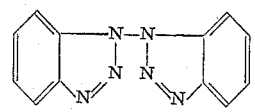

1,1'-bibenzotriazole is resistant to degradation by electrophilic reagents normally used to bring about substitution on benzenoid rings, i.e., reagents such as nitric acid and chlorosulfonic acid. Hence, various substituent groups can be attached to the benzene rings of the hexaaza compound by treating it with such reagents at temperatures below its melting point, i.e., below its thermal decomposition temperature. For example, a mononitro derivative is obtained by nitration of 1,1'-bibenzotriazole with concentrated nitric acid at 0° C.; a dinitro derivative is obtained by nitration with aqua regia (mixture of concentrated nitric and hydrochloric acids) at 25–50° C., or with red fuming nitric acid at 25–100° C.; and sulfo derivatives by treatment with chlorosulfonic acid at 75–125° C.

Nitro derivatives prepared as above can be converted to still further derivatives of 1,1'-bibenzotriazole via conventional hydrogenation techniques. Thus, hydrocarbonoylamido derivatives are obtained by hydrogenation of the nitro derivatives in the presence of a carboxylic acid anhydride and platinum oxide catalyst; and amino derivatives are obtained by hydrogenation of the nitro derivatives in tetrahydrofuran and a platinum oxide catalyst.

Although the maximum number of substituents on each of the benzene rings of 1,1'-bibenzotriazole can be four on a theoretical basis, the number usually obtained by direct electrophilic substitution is 1 or 2. By regulating the strength of the reagents and the conditions of the reactions, however, the total number of substituent groups (i.e., $n$ plus $m$) can be varied from 1 to as high as 6.

All but the amino substituted 1,1'-bibenzotriazoles can be obtained by the tetraazotization-reduction process described above, simply by replacing the starting material, o,o'-diaminoazobenzene, with a substituted o,o'-diaminoazobenzene of the formula

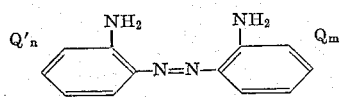

where Q and Q' are alkyl of up to 18 carbons, halogen of atomic number 9–35, sulfo, nitro or hydrocarbonoylamido of up to 18 carbons, and m and n are cardinal numbers of 0–3. 1,1'-bibenzotriazoles having more than two substituents or differently substituted benzo moieties are more readily obtained by this method. Thus, substituent groups such as $NO_2$, hydrocarbonoylamido and $SO_3H$ can be introduced either by direct substitution or through the tetraazotization-reduction process.

The substituted products of this invention have about the same thermal stability as unsubstituted 1,1'-bibenzotriazole, and when heated to their melting points, they decompose with loss of nitrogen to form the corresponding substituted dibenzo-1,3a,4,6a-tetraazapentalenes.

The following examples further illustrate the preparation and properties of the new compounds of this invention.

Example I

To a mixture of 2.1 g. (0.01 g. mole) of o,o'-diaminoazobenzene in 25 ml. of 12% of hydrochloric acid was slowly added a solution of 1.5 g. (0.022 g. mole) of sodium nitrite in 10 ml. of water. The temperature was maintained at 0–5° C. during the addition and throughout the subsequent treatments. The clear homogeneous diazotization mixture was stirred for an additional 30 minutes, and then sulfur dioxide was introduced in a moderately rapid stream while stirring was continued. A solid began to separate almost immediately. After 20 minutes the introduction of sulfur dioxide was stopped and the light tan solid product (1.5 g.) was collected by filtration. Recrystallization of the product from ethyl acetate yielded almost colorless needles, M.P. 233–234° C. A second recrystallization from decalin produced hairlike crystals melting at 235–236° C.

| Anal. for $C_{12}H_8N_6$ | C | H | N |
|---|---|---|---|
| Calc'd | 61.0 | 3.4 | 35.6 |
| Found | 60.8 | 4.6 | 35.6 |

The ultraviolet absorption spectrum of the product dissolved in ethanol shows a distinctive band at 288 mμ (ε 7790) and another at 252mμ (ε 14,630). The infrared absorption spectrum has characteristic bands as follows:

| μ | μ | μ |
|---|---|---|
| 3.26 m | 7.73 sh | 9.91 m |
| 6.19 m | 7.80 m | 11.73 m |
| 6.71 m | 8.11 m | 12.84 s |
| 6.79 w | 8.56 m | 12.94 s |
| 6.89 m | 8.86 w | 13.05 s |
| 6.93 m | 9.33 m | 13.20 s |
| 8.76 s | 9.51 s | 13.34 s | w=weak. m=medium. s=strong. sh=shoulder.

The above-described process was repeated with 4 g. of o,o'-diaminoazobenzene, 45 ml. of 12% hydrochloric acid, and 3 g. of sodium nitrite dissolved in 20 ml. of water. However, the reaction mixture was allowed to stand for two hours after the addition of sulfur dioxide was complete. A total of 3.2 g. (75%) of the compound $C_{12}H_8N_6$, 235–236° C., was obtained.

The $C_{12}H_8N_6$ compound (200 mg.) was dissolved in di(n-butyl) phthalate and heated at 300° C. for ten minutes. The reaction mixture was cooled and diluted with 10 volumes of pentane. A small amount of insoluble dark-colored solid was removed by filtration, and the bright yellow filtrate was evaporated almost to dryness. The concentrate was cooled, and the yellow crystalline product which separated was collected by filtration. The product melted at 231–233° C., and its infrared spectrum was found to be identical to that of dibenzo-1,3a,4,6a-tetraazapentalene (cf., application Serial No. 115,859).

| Anal. for $C_{12}H_8N_4$ | C | H | N |
|---|---|---|---|
| Calc'd | 69.2 | 3.87 | 26.9 |
| Found | 69.4 | 4.37 | 26.6 |

On the basis of the analytical data and the thermal decomposition with formation of dibenzo-1,3a,4,6a-tetraazapentalene, the $C_{12}H_8N_6$ compound is identified as 1,1'-bibenzotriazole.

Example II o,o'-Diaminoazobenzene (1.2 g., 0.006 g. mole) in 4 N hydrochloric acid (6 ml. of concentrated hydrochloric acid diluted with 12 ml. of water) was diazotized by the dropwise addition at 0–5° C. of 1.0 g. (0.0145 g. mole) of sodium nitrite dissolved in 5 ml. of water. The resultant solution was added dropwise to a cold (10° C.) solution of 1.2 g. (0.006 g. mole) of benzalazine in 7 ml. of pyridine. A solid began to separate almost immediately. An additional 35 ml. of pyridine was added, and the mixture was stirred for one hour, after which it was poured into 10 volumes of ice-water. The slightly brown solid precipitate was collected by filtration and dried. Yield, 1.7 g. The product, recrystallized from ethyl acetate, melted at 234–238° C. (dec.), and was identified as 1,1'-bibenzotriazole. Further recrystallization from a chloroform-pentene mixture did not change the melting point of the product.

| Anal. for $C_{12}H_8N_6$ | C | H | N |
|---|---|---|---|
| Calc'd | 61.0 | 3.4 | 35.6 |
| Found | 60.7 | 3.5 | 34.7 |

Example III o,o'-Diaminoazobenzene (2.12 g., 0.01 g. mole) dissolved in 4 N HCl (10 ml. of concentrated hydrochloric acid diluted with 20 ml. of water) was diazotized with 1.3 g., 0.02 g. mole) of sodium nitrite dissolved in 10 ml. of water. The procedure of the previous examples was used. The cold diazotate solution was added slowly at 7–10° C. to 10 ml. of a pyridine solution containing 1.4 g. of acetoneazine. The mixture was stirred for one hour and then was poured into an excess of water. The brown solid precipitated was collected by filtration and was purified by recrystallization from ethyl acetate, M.P. 238–240° C. (dec.). The infrared spectrum of this product is identical to that of 1,1'-bibenzotriazole prepared in Examples I and II.

| Anal. for $C_{12}H_8N_6$ | C | H | N |
|---|---|---|---|
| Calc'd | 61.0 | 3.5 | 35.6 |
| Found | 60.9 | 3.8 | 35.2 |

Example IV 1,1'-bibenzotriazole (3.0 g., 0.013 g. mole) was added gradually to 30 ml. (ca. 0.5 g. mole) of concentrated nitric acid at 0° C., with stirring. The reaction mixture was stirred for one hour at 0° C., and was then poured into 10 volumes of ice-water. The solid which separated was collected by filtration, washed well with water, and dried. Yield, 3.6 g. Recrystallization of the product from a 3:1 dimethylformamide:water mixture afforded nearly colorless crystals, M.P. 248–250° C. (dec.). The product corresponds to a mononitro derivative, possibly contaminated with a small amount of dinitro derivative.

| Anal. for $C_{12}H_7N_7O_2$ | C | H | N |
|---|---|---|---|
| Calc'd | 51.2 | 2.5 | 34.9 |
| Found | 50.1 | 2.0 | 35.9 |

A portion of the mononitro derivative was suspended in Dowtherm and heated to boiling (ca. 260° C.) for 10 minutes. The solid dissolved, and during the course of the pyrolysis the solution became deep yellow. The yellow solution was cooled and then poured into pentane. The supernatant (pentane) layer exhibited a yellow-green fluorescent color characteristic of nitrated dibenzo-1,3a,4,6a-tetraazapentalene.

*Example V*

A 200 mg. portion of the mononitro derivative of 1,1'-bibenzotriazole prepared in Example IV was dissolved in 100 ml. of a mixture of acetic anhydride and tetrahydrofuran, and was hydrogenated in the presence of 100 mg. of platinum oxide catalyst for two hours at room temperature under 40 lb./sq. in. of hydrogen pressure. A crystalline product was isolated whose infrared spectrum, with peaks at 3.0 and 6.0μ, indicated that the nitro group had been converted to an acetamido group.

Any carboxylic acid anhydride of 4 to 36 carbons can be substituted for acetic anhydride in the process of the above example to obtain the corresponding hydrocarbonylamido-substituted 1,1'-bibenzotriazole.

*Example VI*

1,1'-bibenzotriazole (1.0 g., 0.00425 g. mole) was added in portions to 10 ml. of stirred red fuming nitric acid over a 3-minute period, with no external cooling. The mixture became warm and deeply red in color. It was stirred for 40 minutes and then poured into 200 ml. of ice-water, the red color being thereby discharged. The product separated as a solid, was collected on a suction filter, and was washed with water and ethanol. Yield, 1.1 g. The product was divided into two approximately equal parts by extraction with 40 ml. of methylene chloride. The part that dissolved in the methylene chloride was recovered as crystals after evaporation of most of the solvent; and the originally undissolved portion was recrystallized from o-dichlorobenzene. The two parts were identical in melting point, 258–261° C. (dec.), and in infrared absorption characteristics. Elemental analysis corresponds to a dinitro derivative of 1,1'-bibenzotriazole.

| Anal. for $C_{12}H_6N_8O_4$ | C | H | N |
|---|---|---|---|
| Calc'd | 44.2 | 1.85 | 34.4 |
| Found | 44.2 | 2.16 | 34.4 |

*Example VII*

The dinitro derivative prepared in Example VI (200 mg.) was dissolved in 100 ml. of tetrahydrofuran and hydrogenated in the presence of 100 mg. of platinum oxide catalyst for two hours at room temperature under a hydrogen pressure of 40 lb./sq. in. The catalyst was removed by filtration and the solvent was evaporated under reduced pressure. The residual product was a yellow solid, which was recrystallized from ethanol to yield 120 mg. of yellow crystals. The infrared absorption spectrum of the product has characteristic peaks for the amino function in the 3μ and 6μ regions, and shows an absence of the nitro function.

| Anal. for $C_{12}H_{10}N_8$ | C | H | N |
|---|---|---|---|
| Calc'd | 54.1 | 3.8 | 42.1 |
| Found | 53.7 | 4.3 | 40.8 |

*Example VIII*

To 100 ml. of concentrated nitric acid (1.56 g. mole) was added 3.0 g. (0.013 g. mole) of 1,1'-bibenzotriazole, with stirring and external cooling by an icebath. The temperature was allowed to rise to 25° C. in 3 hours as stirring was continued, and then 25 ml. (0.3 g. mole) of concentrated hydrochloric acid was added. The mixture was heated externally to 50° C., and then stirred four more hours without external heat or cooling. Finally the reaction mixture was diluted 1:1 with water, and the solid which precipitated was separated by filtration. Recrystallization of the product from 200 ml. of ethyl acetate yielded crystals which were identified as the dinitro derivative of 1,1'-bibenzotriazole described in Example VI.

*Example IX*

The mononitro derivative (1.0 g.) of 1,1'-bibenzotriazole, i.e., the product of Example IV, was added gradually with stirring to 20 ml. of red fuming nitric acid. The mixture was heated on a steam bath for 5 minutes, cooled to room temperature, and poured into ice-water. A yellow-tan solid product was formed and was collected on a filter. Recrystallization of the product from dimethylformamide afforded a crystalline derivative, whose infrared spectrum was identical to that of the dinitro derivative of 1,1'-bibenzotriazole described in Examples VI and VIII.

| Ana. for $C_{12}H_6N_8O_4$ | C | H |
|---|---|---|
| Calc'd | 44.2 | 1.85 |
| Found | 44.1 | 2.23 |

*Example X*

A mixture (1.2 g.) of mono- and dinitro derivatives of 1,1'-bibenzotriazole in 20 ml. of diphenyl ether was heated at 200–225° C. for 2.5 hours. The mixture turned deep yellow-brown in color. After removal of the solvent by distillation at 0.5 mm., the residue was fractionated by chromatography through neutral alumina with methylene chloride followed by methylene chloride containing 1% by volume of ethyl acetate. Eluants of the methylene chloride-ethyl acetate mixture were evaporated and the residues were combined and taken up in dioxane. Crystalline solid thus obtained was identified by infrared spectra as unchanged mononitro derivative which did not decompose to the corresponding tetraazapentalene because of the relatively low temperature employed. Dilution of the dioxane mother liquor with water yielded fluorescent yellow crystals which corresponded to dinitrodibenzo-1,3a,4,6a-tetraazapentalene.

| Anal. for $C_{12}H_6N_8O_4$ | C | H |
|---|---|---|
| Calc'd | 48.3 | 2.0 |
| Found | 48.4 | 2.2 |

Substituted 1,1'-bibenzotriazoles of the formula

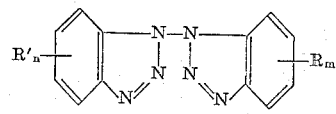

where R and R' are Q and Q', respectively, Q and Q' being as defined above, are readily prepared simply by substituting an o,o'-diaminoazobenzene of the formula

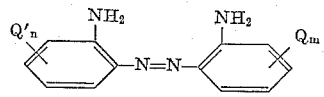

for o,o'-diaminoazobenzene in the process of Examples I–III. Examples of R and R' substituents which can be introduced in this manner are the sulfo and nitro groups, alkyl groups of up to 18 carbon atoms (e.g., methyl, ethyl, isopropyl, pentyl, heptyl, octyl, dodecyl and octadecyl), halogens (e.g., fluorine, chlorine and bromine) and hydrocarbonoylamido groups of up to 18 carbons (e.g., acetamido, butyramido, decanecarbamido, stearamido, undecylenamido, oleamido, cyclohexanehexanecarbamido and benzamido). Because their precursors are more readily available, the preferred alkyl groups are those of 1–7 carbons, and the preferred hydrocarbonoylamido groups are those of the formula

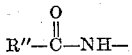

wherein R″ is an alkyl group of 1–6 carbons or the phenyl group.

Of the substituted 1,1′-bibenzotriazoles of this invention, those of the above formula wherein m and n are 1 or 2 are more easily prepared and hence are preferred.

The applicability of the tetraazotization-reduction process of Examples I–III to the preparation of substituted 1,1′-bibenzotriazoles is illustrated by the following example.

*Example XI*

To a soluiton of 12 g. (0.05 g. mole) of dimethyl-o,o′-diaminoazobenzene (consisting of a mixture of 4,4′-dimethyl- and 5,5′-dimethyl-2,2′-diaminoazobenzene) in 80 ml. of concentrated hydrochloric acid and 100 ml. of water at 0–5° C. was added a solution of 8.75 g. (0.127 g. mole) of sodium nitrite in 30 ml. of water. The mixture was stirred an additional 30 minutes after the addition was complete, the temperature being maintained below 8° C. throughout. Sulfur dioxide was then passed at a rapid rate into the stirred solution over a period of 20 minutes, with the temperature maintained below 10° C. The resultant reaction mixture was warmed to room temperature, and the solid product was separated and washed with water on a filter. The dried product weighed 12.0 g. and melted over the range 175–210° C. An analytical sample was purified by continuous column chromatography on neutral alumina using methanol as solvent, and the principal product thus obtained, dimethyl-1,1′-bibenzotriazole, was isolated as long needles, M.P. 230–232° C.

| Anal. for $C_{14}H_{12}N_6$ | C | H | N |
|---|---|---|---|
| Calc'd | 63.6 | 4.58 | 31.8 |
| Found | 63.6 | 4.63 | 31.0 |
|  | 63.7 | 4.74 | 31.0 |

When 2,2′-diamino-4,4′,6,6′-tetramethylazobenzene is substituted for the dimethyl diaminoazobenzenes in the process of the above example, the corresponding tetramethyl-1,1′-bibenzotriazole is obtained.

The 1,1′-bibenzotriazoles of this invention have many unique and interesting properties. One such property is their resistance to ring-opening hydrogenation by means of lithium aluminum hydride. Also, as was noted above, they are useful as intermediates to the corresponding dibenzo-1,3a,4,6a-tetraazapentalenes, which are actinic light absorbers and thus are useful in the preparation of filters, e.g., for use in spectroscopic applications, and actinic light-opaque cellulosic films, e.g., for use in wrapping articles of commerce such as foodstuffs. In addition, because the compounds of this invention decompose at their melting points with evolution of gaseous nitrogen, they are useful as high temperature blowing agents in the preparation of foamed structures from thermoplastic polymers or from thermally-curable polymeric materials, e.g., in injection molding processes.

Since obvious modifications and equivalents in the invention will be evident to those skilled in the chemical arts, I propose to be bound solely by the appended claims.

The embodiments of the invention in which an exclusive property or privilege is claimed are defined as follows:

1. A compound of the formula

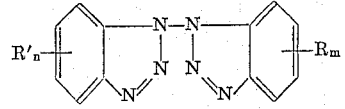

wherein R and R′ each represent a member of the group consisting of alkyl of up to 18 carbons, halogen of atomic number 9–35, sulfo, nitro, amino and hydrocarbonoylamido of up to 18 carbons; and each of m and n is a cardinal number of 0–3.

2. 1,1′-bibenzotriazole.
3. Mononitro-1,1′-bibenzotriazole.
4. Monoacetamido-1,1′-bibenzotriazole.
5. Dinitro-1,1′-bibenzotriazole.
6. Diamino-1,1′-bibenzotriazole.
7. Dimethyl-1,1′-bibenzotriazole.
8. In a method of preparing 1,1′-bibenzotriazoles the step which comprises reducing the bisdiazonium salt prepared by;

tetraazotizing an o,o′-diaminoazobenzene of the formula

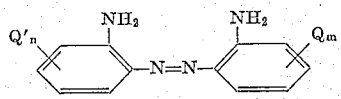

where Q and Q′ each represents a member of the group consisting of alkyl of up to 18 carbons, halogen of atomic number 9–35, sulfo, nitro and hydrocarbonoylamide of up to 18 carbons, and each of m and n is a cardinal number of 0–3, with at least one equivalent of a member of the group consisting of sulfur dioxide, copper-hydrobromic acid reagent and an azine derivative of an organic carbonyl compound at a temperature below 20° C.

9. The process of claim 8 wherein o,o′-diaminoazobenzene is reacted with at least two equivalents of sodium nitrite in aqueous hydrochloric acid at a temperature of 0–10° C.

10. A method of preparing a dibenzo-1,3a,4,6a-tetraazapentalene which comprises heating a compound of claim 1 up to at least its melting point, whereupon the compound decomposes with loss of nitrogen to form the corresponding dibenzo-1,3a,4,6a-tetraazapentalene.

11. A method of preparing dibenzo-1,3a,4,6a-tetraazapentalene which comprises heating 1,1′-bibenzotriazole to a temperature within the range of from 233° up to at least 240° C.

References Cited by the Examiner

UNITED STATES PATENTS

Re. 25,238   9/62   Carboni _____ 260—308

OTHER REFERENCES

Elderfield: Heterocyclic Compounds, vol. 7 (New York, 1961), pages 386, 402–4, 408–11.

Karrer: Organic Chemistry (New York, 1950), pages 472–81.

McElvain: The Characterization of Organic Compounds (New York, 1953), pages 5–6.

IRVING MARCUS, *Primary Examiner.*

NICHOLAS S. RIZZO, WALTER A. MODANCE, *Examiners.*

UNITED STATES PATENT OFFICE
CERTIFICATE OF CORRECTION

Patent No. 3,184,472  May 18, 1965

Rudolph A. Carboni

It is hereby certified that error appears in the above numbered patent requiring correction and that the said Letters Patent should read as corrected below.

Column 1, lines 22 and 23, for "1,1′-bibenzotriabole" read -- 1,1′-bibenzotriazole --; column 2, lines 9 and 10, for "decomposite" read -- decomposition --; column 3, lines 3 to 6, the formula should appear as shown below instead of as in the patent:

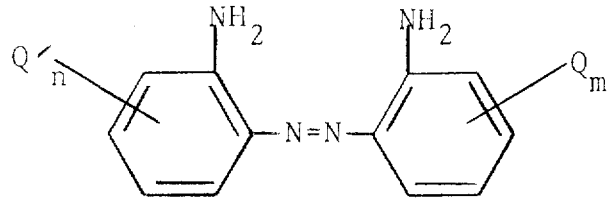

column 4, in the last table, third column, line 1 thereof, for "3." read -- 3.4 --; column 8, lines 33 and 34, for "hydrocarbonoylamide" read -- hydrocarbonoylamido --.

Signed and sealed this 18th day of January 1966.

(SEAL)
Attest:

ERNEST W. SWIDER
Attesting Officer

EDWARD J. BRENNER
Commissioner of Patents